US012647414B2

(12) United States Patent
Short, III et al.

(10) Patent No.: US 12,647,414 B2
(45) **Date of Patent: *Jun. 2, 2026**

(54) USER AUTHENTICATED ENCRYPTED COMMUNICATION LINK

(71) Applicant: VirnetX, Inc., Zephyr Cove, NV (US)

(72) Inventors: Robert Dunham Short, III, Leesburg, VA (US); Nathaniel Jackson Short, Crofton, MD (US); Michael Glenn Williamson, South Riding, VA (US)

(73) Assignee: VirnetX, Inc., Zephyr Cove, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,773

(22) Filed: Mar. 4, 2024

(65) Prior Publication Data

US 2024/0291814 A1 Aug. 29, 2024

Related U.S. Application Data

(63) Continuation of application No. 17/646,573, filed on Dec. 30, 2021, now Pat. No. 11,924,202, which is a
(Continued)

(51) Int. Cl.
*H04L 9/40* (2022.01)
*H04L 61/4511* (2022.01)

(52) U.S. Cl.
CPC ...... *H04L 63/0861* (2013.01); *H04L 61/4511* (2022.05); *H04L 63/0428* (2013.01); *H04L 63/08* (2013.01); *H04L 63/10* (2013.01)

(58) Field of Classification Search
None
See application file for complete search history.

(56) References Cited

U.S. PATENT DOCUMENTS 6,502,135 B1 * 12/2002 Munger ................. H04L 63/08
709/225
6,668,246 B1 12/2003 Yeung et al.
(Continued)

OTHER PUBLICATIONS

Allen, et al., "Securing a Wireless Network," Nov. 20-23, 2002, pp. 213-215, SIGUCCS'02, Providence, USA.
(Continued)

*Primary Examiner* — William J. Goodchild
(74) *Attorney, Agent, or Firm* — Lee & Hayes, P.C.

(57) ABSTRACT

Systems and methods are provided for establishing a secure communication link between a first client and a second client. One exemplary computer-implemented method for establishing a secure communication link between a first diem and a second client includes accessing, from a storage, identification information of a user of the first client. The method further includes receiving a Domain Name Service (DNS) request from the first client requesting a secure network address corresponding to a secure domain name associated with the second client. The method further includes authenticating the user based on the user identification information. The method also includes transmitting the secure computer network address in response to the DNS request based on a determination that the user has been authenticated. A secure communication link between the first diem and the second client is established based on the secure computer network address.

18 Claims, 7 Drawing Sheets

Related U.S. Application Data continuation of application No. 16/299,607, filed on Mar. 12, 2019, now Pat. No. 11,240,235, and a continuation of application No. 16/299,434, filed on Mar. 12, 2019, now Pat. No. 11,245,692, said application No. 16/299,607 is a continuation of application No. 15/376,434, filed on Dec. 12, 2016, now Pat. No. 10,498,728, said application No. 16/299,434 is a continuation of application No. 15/376,434, filed on Dec. 12, 2016, now Pat. No. 10,498,728, which is a continuation of application No. 14/037,301, filed on Sep. 25, 2013, now Pat. No. 9,521,130.

(60) Provisional application No. 61/705,457, filed on Sep. 25, 2012.

(56) References Cited

U.S. PATENT DOCUMENTS

| | | | | |
|---|---|---|---|---|
| 7,519,202 | B2 | 4/2009 | Caspi et al. | |
| 7,978,714 | B2 | 7/2011 | Rao et al. | |
| 8,140,573 | B2 * | 3/2012 | McKay | G06Q 10/10 707/778 |
| 8,141,135 | B2 | 3/2012 | Nagami et al. | |
| 8,166,528 | B2 * | 4/2012 | Inoue | H04L 61/5046 370/328 |
| 8,201,233 | B2 | 6/2012 | Beaulieu et al. | |
| 8,266,443 | B2 | 9/2012 | Errico | |
| 2001/0039619 | A1 * | 11/2001 | Lapere | H04L 9/3231 713/186 |
| 2001/0054889 | A1 * | 12/2001 | Danet | H03H 7/12 324/76.29 |
| 2002/0004902 | A1 * | 1/2002 | Toh | H04L 63/0442 713/176 |
| 2002/0035681 | A1 * | 3/2002 | Maturana | H04L 63/166 713/151 |
| 2002/0055987 | A1 * | 5/2002 | Tsujisawa | H04W 12/37 709/219 |
| 2002/0062342 | A1 * | 5/2002 | Sidles | H04L 67/561 715/224 |
| 2002/0064279 | A1 * | 5/2002 | Uner | H04L 9/0662 380/44 |
| 2002/0103931 | A1 * | 8/2002 | Mott | H04L 12/4641 709/219 |
| 2002/0129285 | A1 | 9/2002 | Kuwata et al. | |
| 2002/0176611 | A1 | 11/2002 | Dong | |
| 2003/0014706 | A1 * | 1/2003 | Poeluev | H03M 13/07 714/752 |
| 2003/0026428 | A1 * | 2/2003 | Loisel | H04L 63/0442 380/277 |
| 2003/0131245 | A1 * | 7/2003 | Linderman | H04L 63/0218 713/176 |
| 2003/0226040 | A1 * | 12/2003 | Challener | G06F 21/78 713/193 |
| 2004/0034771 | A1 * | 2/2004 | Edgett | H04L 63/0846 713/153 |
| 2004/0054889 | A1 | 3/2004 | Pitsos | |
| 2004/0083297 | A1 * | 4/2004 | Gazzetta | H04L 63/083 709/228 |
| 2004/0098485 | A1 * | 5/2004 | Larson | H04L 61/4511 709/227 |
| 2004/0158708 | A1 * | 8/2004 | Peyravian | H04L 9/3236 713/176 |
| 2004/0243805 | A1 * | 12/2004 | Enokida | H04L 9/0891 713/175 |
| 2005/0074122 | A1 * | 4/2005 | Fascenda | H04L 63/083 380/258 |
| 2005/0131997 | A1 * | 6/2005 | Lewis | H04L 63/10 709/203 |
| 2006/0143453 | A1 * | 6/2006 | Imamoto | H04L 9/3273 713/169 |
| 2007/0011464 | A1 * | 1/2007 | Gorelik | H04L 9/3247 726/17 |
| 2007/0034771 | A1 | 2/2007 | Liu | |
| 2007/0039042 | A1 * | 2/2007 | Apelbaum | H04L 9/14 726/6 |
| 2007/0050622 | A1 * | 3/2007 | Rager | G06F 21/445 713/168 |
| 2007/0056022 | A1 | 3/2007 | Dvir | |
| 2007/0061572 | A1 * | 3/2007 | Imai | H04L 9/3026 713/169 |
| 2007/0156829 | A1 * | 7/2007 | Deboy | G06F 21/33 709/206 |
| 2007/0178914 | A1 | 8/2007 | Montenegro | |
| 2007/0192842 | A1 * | 8/2007 | Beaulieu | H04L 63/068 726/9 |
| 2008/0183853 | A1 * | 7/2008 | Manion | H04L 67/1093 709/223 |
| 2008/0215883 | A1 * | 9/2008 | Fok | H04W 12/06 713/167 |
| 2009/0083544 | A1 * | 3/2009 | Scholnick | H04L 9/3231 713/186 |
| 2009/0112814 | A1 | 4/2009 | Statia et al. | |
| 2009/0183247 | A1 | 7/2009 | Kasper et al. | |
| 2010/0186072 | A1 | 7/2010 | Kumar | |
| 2010/0191967 | A1 * | 7/2010 | Fujii | H04L 63/0861 713/169 |
| 2010/0281146 | A1 * | 11/2010 | Lee | H04L 61/4511 709/221 |
| 2011/0191586 | A1 * | 8/2011 | Jung | H04L 9/3271 713/168 |
| 2012/0028609 | A1 * | 2/2012 | Hruska | H04W 12/02 455/411 |
| 2012/0131665 | A1 | 5/2012 | Larson | |
| 2012/0159607 | A1 | 6/2012 | Wei et al. | |
| 2012/0173867 | A1 * | 7/2012 | Hirabayashi | G06F 21/123 713/150 |
| 2012/0204236 | A1 | 8/2012 | Chen et al. | |
| 2012/0226795 | A1 | 9/2012 | Larson et al. | |
| 2013/0151540 | A1 * | 6/2013 | Pathak | G06Q 10/101 707/754 |
| 2019/0207934 | A1 | 7/2019 | Short, III et al. | |
| 2019/0215321 | A1 | 7/2019 | Short, III et al. | |
| 2022/0131858 | A1 | 4/2022 | Short, III et al. | |

OTHER PUBLICATIONS

Office Action dated Jan. 6, 2020 for U.S. Appl. No. 16/299,434 "User Authenticated Encrypted Communication Link" Short, 9 pages.

Office Action dated Jan. 6, 2020 for U.S. Appl. No. 16/299,607 "User Authenticated Encrypted Communication Link" Short, 10 pages.

Office Action for U.S. Appl. No. 16/299,434, mailed on Jan. 28, 2021, Short III, "User Authenticated Encrypted Communication Link", 13 Pages.

Office Action dtd Mar. 14, 2019 for U.S. Appl. No. 15/376,434 "User Authenticated Encrypted Communication Link" Short, 6 pages.

Office Action dated Jul. 2, 2020 for U.S. Appl. No. 16/299,434, "User Authenticated Encrypted Communication Link", Short III, 18 pages.

Office action for U.S. Appl. No. 15/376,434, mailed on Nov. 16, 2018, Short,, "User Authenticated Encrypted Communication Link", 6 pages.

Office Action dated Mar. 15, 2021 for U.S. Appl. No. 16/299,607 "User Authenticated Encrypted Communication Link" Short, 9 pages.

Office Action for U.S. Appl. No. 17/646,573, mailed on Jun. 16, 2023, Short III, "User Authenticated Encrypted Communication Link", 19 Pages.

Office Action dated Jul. 20, 2020 for U.S. Appl. No. 16/299,607 "User Authenticated Encrypted Communication Link" Short, 9 pages.

* cited by examiner

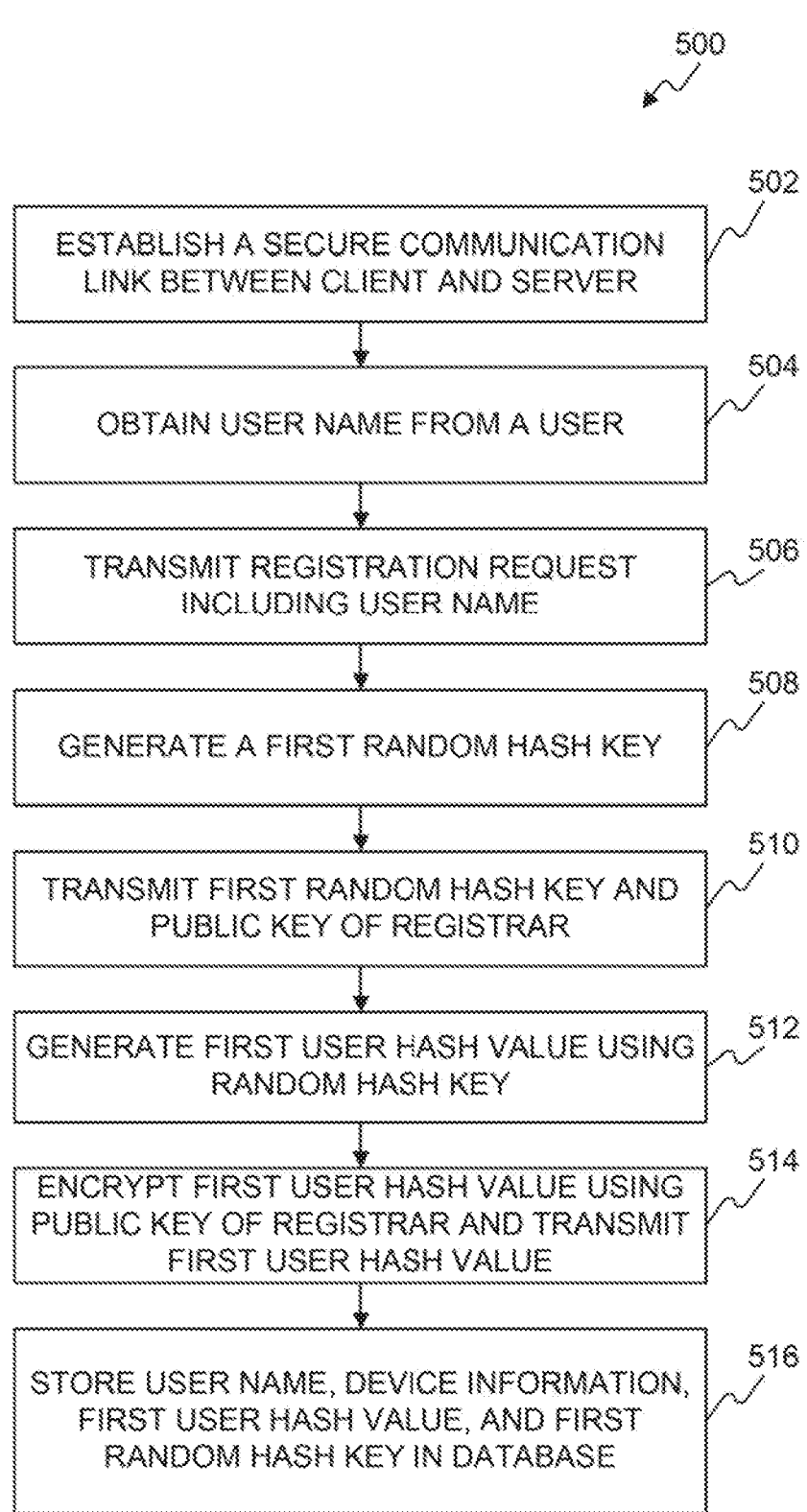

500

502
ESTABLISH A SECURE COMMUNICATION
LINK BETWEEN CLIENT AND SERVER

504
OBTAIN USER NAME FROM A USER

506
TRANSMIT REGISTRATION REQUEST
INCLUDING USER NAME

508
GENERATE A FIRST RANDOM HASH KEY

510
TRANSMIT FIRST RANDOM HASH KEY AND
PUBLIC KEY OF REGISTRAR

512
GENERATE FIRST USER HASH VALUE USING
RANDOM HASH KEY

514
ENCRYPT FIRST USER HASH VALUE USING
PUBLIC KEY OF REGISTRAR AND TRANSMIT
FIRST USER HASH VALUE

516
STORE USER NAME, DEVICE INFORMATION,
FIRST USER HASH VALUE, AND FIRST
RANDOM HASH KEY IN DATABASE

FIG. 5

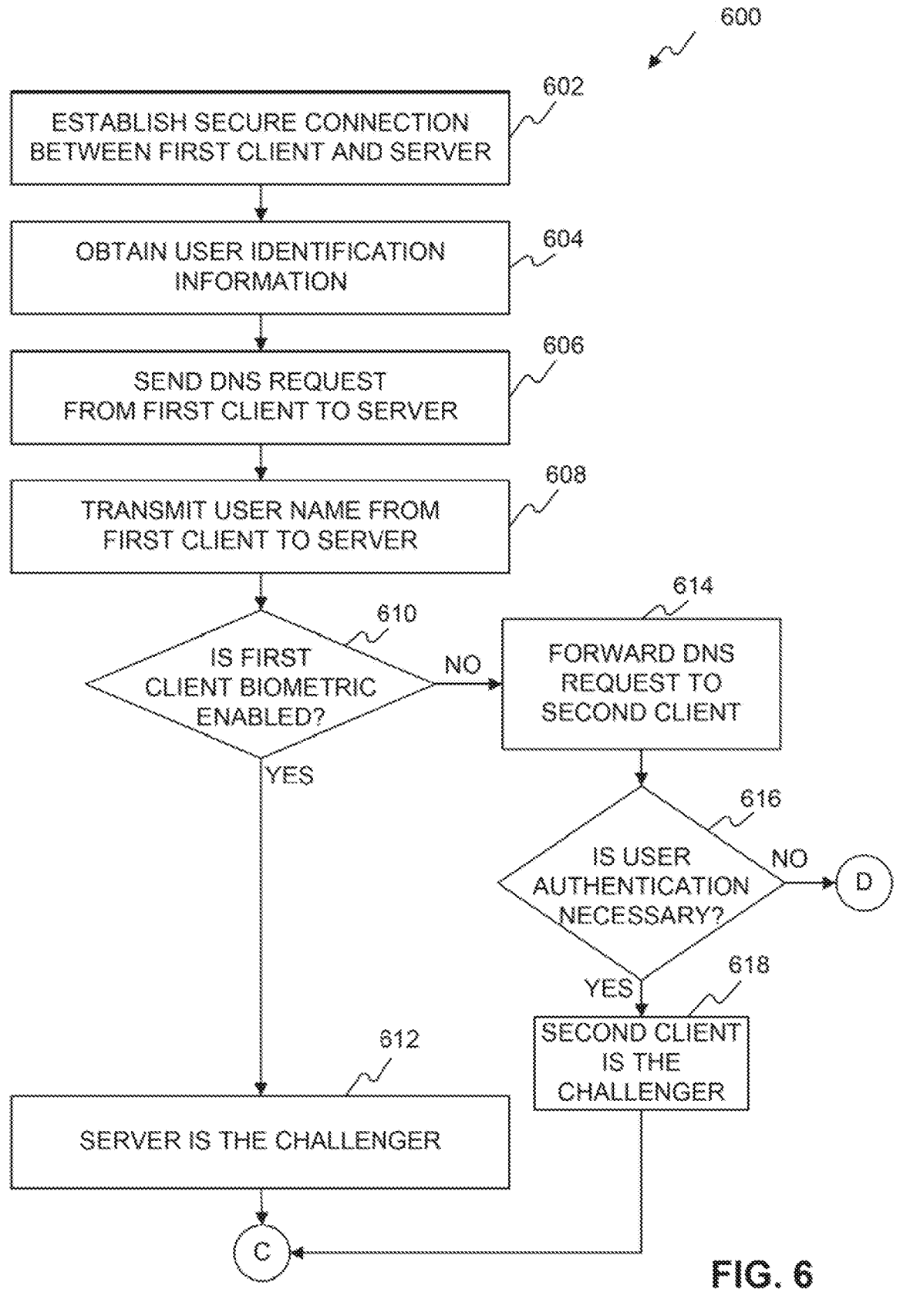

600

ESTABLISH SECURE CONNECTION
BETWEEN FIRST CLIENT AND SERVER                    602

OBTAIN USER IDENTIFICATION
INFORMATION                                        604

SEND DNS REQUEST
FROM FIRST CLIENT TO SERVER                        606

TRANSMIT USER NAME FROM
FIRST CLIENT TO SERVER                             608

IS FIRST
CLIENT BIOMETRIC
ENABLED?                                           610

NO

FORWARD DNS
REQUEST TO
SECOND CLIENT                                      614

YES

IS USER
AUTHENTICATION
NECESSARY?                                         616

NO → D

YES

SECOND CLIENT
IS THE
CHALLENGER                                         618

SERVER IS THE CHALLENGER                           612

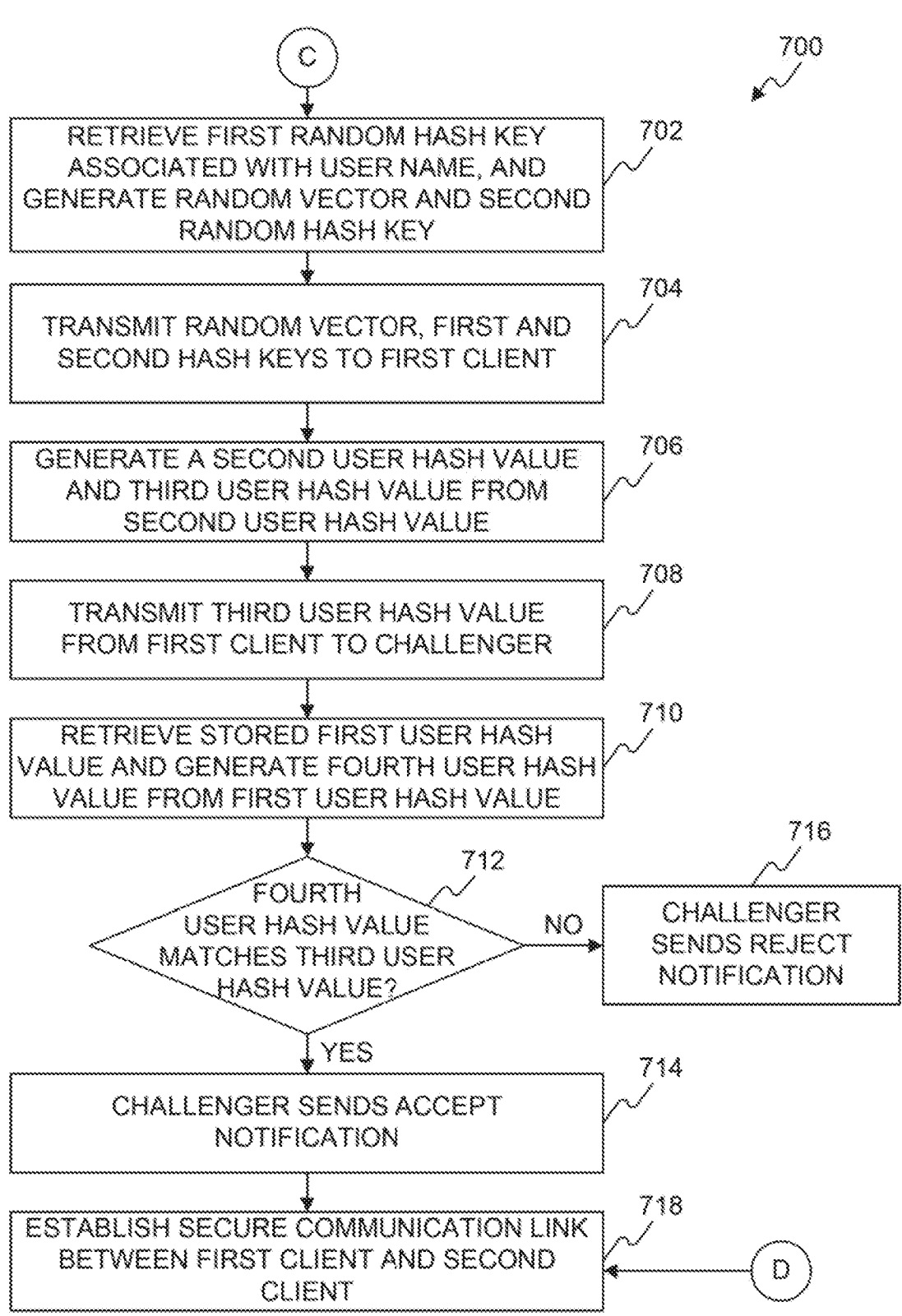

C

700

RETRIEVE FIRST RANDOM HASH KEY ASSOCIATED WITH USER NAME, AND GENERATE RANDOM VECTOR AND SECOND RANDOM HASH KEY — 702

TRANSMIT RANDOM VECTOR, FIRST AND SECOND HASH KEYS TO FIRST CLIENT — 704

GENERATE A SECOND USER HASH VALUE AND THIRD USER HASH VALUE FROM SECOND USER HASH VALUE — 706

TRANSMIT THIRD USER HASH VALUE FROM FIRST CLIENT TO CHALLENGER — 708

RETRIEVE STORED FIRST USER HASH VALUE AND GENERATE FOURTH USER HASH VALUE FROM FIRST USER HASH VALUE — 710

FOURTH USER HASH VALUE MATCHES THIRD USER HASH VALUE? — 712

NO → CHALLENGER SENDS REJECT NOTIFICATION — 716

YES

CHALLENGER SENDS ACCEPT NOTIFICATION — 714

ESTABLISH SECURE COMMUNICATION LINK BETWEEN FIRST CLIENT AND SECOND CLIENT — 718

USER AUTHENTICATED ENCRYPTED COMMUNICATION LINK

CROSS-REFERENCE TO RELATED APPLICATIONS

The present application is a continuation of co-pending U.S. application Ser. No. 17/646,573 filed Dec. 30, 2021, which is a continuation of U.S. application Ser. No. 16/299,607 filed Mar. 12, 2019, now U.S. Pat. No. 11,240,235, and is a continuation of Ser. No. 16/299,434, filed Mar. 12, 2019, now U.S. Pat. No. 11,245,692, which are a continuation of U.S. application Ser. No. 15/376,434, filed Dec. 12, 2016, Now U.S. Pat. No. 10,498,729, which is a continuation of U.S. application Ser. No. 14/037,301, filed Sep. 25, 2013, now U.S. Pat. No. 9,521,130, which claims the benefit of priority under 35 U.S.C. § 119 from U.S. Provisional Patent Application Ser. No. 61/705,457 entitled "Biometric Enhanced Secure Domain Names," filed on Sep. 25, 2012, the disclosures of which are hereby incorporated by reference in their entirety for all purposes.

BACKGROUND

Technical Field

The present disclosure relates generally to the field of secure electronic communications between two or more electronic communications devices. More particularly, and without limitation, the present disclosure relates to systems and methods for establishing a secure communication link between electronic communications devices in which users of the devices are authenticated to establish the secure communication link.

Description of the Related Art

The Internet has experienced explosive growth and use in recent years. Moreover, with the advent of smartphones, tablets, and personal digital assistants (PDAs), users have become accustomed to transmitting and receiving information from users of other devices on a regular basis and from any location. A vast amount of such electronic communication, however, remains vulnerable to access by third party eavesdroppers, who may access the information in transit between the communicating electronic devices and/or users. It is desirable to exchange information privately between the participating devices, without allowing unauthorized access to the information.

A variety of methods have been proposed to establish secure communication links between devices. Some of these methods rely on encryption of the information before it is communicated. This requires providing a recipient device with means to unencrypt the information upon receipt. Although the information may be encrypted during transit, current methods may not prevent a rogue user with access to another user's device from accessing the encrypted information received by that user's device.

SUMMARY

In view of the above deficiencies, there is a need for improved systems and methods for establishing a secure communication link between electronic devices in which the users of the communicating devices are identified and authenticated. More particularly, there is a need for improved systems and methods, which restrict use of the secure communication link to authenticated users at both ends of the link.

In accordance with the present disclosure, systems and methods are provided for establishing a secure communication link between two or more electronic communication devices. In accordance with certain embodiments, a method for establishing a secure communications link with authenticated users at both ends of the link is provided. As disclosed herein, embodiments of the present disclosure may allow an electronics communication device or a client to establish a secure communication link with another client only when users of both clients have been authenticated. Embodiments of the present disclosure may also allow registration of users with their authentication information to enable authentication of the users before establishing a secure communication link.

In accordance with one exemplary embodiment, a computer-implemented method is provided for establishing a secure communication link between a first client and a second client. By way of example, the method comprises: accessing, from a storage, identification information of a user of the first client; receiving a Domain Name Service (DNS) request from the first client requesting a secure network address corresponding to a secure domain name associated with the second client; authenticating the user based on the user identification information; and transmitting the secure computer network address in response to the DNS request based on a determination that the user has been authenticated, wherein a secure communication link between the first client and the second client is established based on the secure computer network address.

In accordance with another exemplary embodiment, the step of authenticating the user in the computer-implemented method includes: receiving, from the first client, a first hash value based on the identification information; comparing the first hash value to a second hash value; sending an accept notification to the first client when the first hash value matches the second hash value; and sending a reject notification to the first client when the first hash value does not match the second hash value.

In accordance with another exemplary embodiment, the step of receiving the first hash value in the computer-implemented method includes: retrieving a random vector and a random hash key from the server; sending the retrieved random vector and random hash key to the first client; receiving, from the first client, the first hash value, the first hash value being generated by: generating a user vector by combining the random vector and the identification information; and performing a hashing operation on the user vector using the random hash key.

In accordance with another exemplary embodiment, the computer-implemented method further includes: receiving a user name for the user from the first client; accessing a database that stores second hash values in association with user names; and retrieving the second hash value corresponding to the user name from the database.

In accordance with another exemplary embodiment, the computer-implemented method further includes: authenticating, in addition to the user, the first client; and transmitting the secure computer network address in response to the DNS request based on a determination that the user has been authenticated and also that the first client has been authenticated.

In accordance with another exemplary embodiment, a secure domain name server is provided for establishing a secure communication link between a first client and a second client. By way of example, the secure domain name server includes: a data storage device storing identification information for a plurality of clients; and one or more processors. The one or more processors may be configured to: access, from the storage, identification information of a user of the first client; receive a. Domain Name Service (DNS) request from the first client requesting a secure network address corresponding to a secure domain name associated with the second client; authenticate the user based on the user identification information; and transmit the secure computer network address in response to the DNS request based on a determination that the user has been authenticated, wherein a secure communication link between the first client and the second client is established based on the secure computer network address.

In accordance with another exemplary embodiment, the one or more processors of the server may be further configured to: receive, from the first client, a first hash value based on the identification information; compare the first hash value to a second hash value; send an accept notification to the first client when the first hash value matches the second hash value; and send a reject notification to the first client when the first hash value does not match the second hash value.

In accordance with another exemplary embodiment, the one or more processors of the server may be further configured to: retrieve a random vector and a random hash key from the server; send the retrieved random vector and random hash key to the first client; receive, from the first client, the first hash value, the first hash value being generated by: generating a user vector by combining the random vector and the identification information; and performing a hashing operation on the user vector using the random hash key.

In accordance with another exemplary embodiment, the one or more processors of the server may be further configured to: receive a user name for the user from the first client; access a database that stores second hash values in association with user names; and retrieve the second hash value corresponding to the user name from the database.

In accordance with another exemplary embodiment, the one or more processors of the server may be further configured to: authenticate, in addition to the user, the first client; and transmit the secure computer network address in response to the DNS request based on a determination that the user has been authenticated and also that the first client has been authenticated.

In accordance with another exemplary embodiment, the one or more processors of the server may be further configured to: determine whether the first client is enabled for biometric authentication of the user; and perform the accessing and authentication steps based on a determination that the first client is enabled for biometric authentication of the user.

Additional objects and advantages of the embodiments of the present invention will be set forth in part in the description which follows, and in part will be obvious from the description, or may be learned by practice of the embodiments of the present disclosure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this present disclosure, illustrate several embodiments of the present disclosure and, together with the description, serve to explain the principles of the present disclosure. In the drawings:

FIG. 5 shows another exemplary method of registering a user, consistent with an embodiment of the present disclosure;

FIG. 6 shows another exemplary method of authenticating a user to provide a user-authenticated secure communication link, consistent with embodiments of the present disclosure; and FIG. 7 shows another exemplary method of authenticating a user to provide a user-authenticated secure communication link, consistent with an embodiment of the present disclosure.

DETAILED DESCRIPTION

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
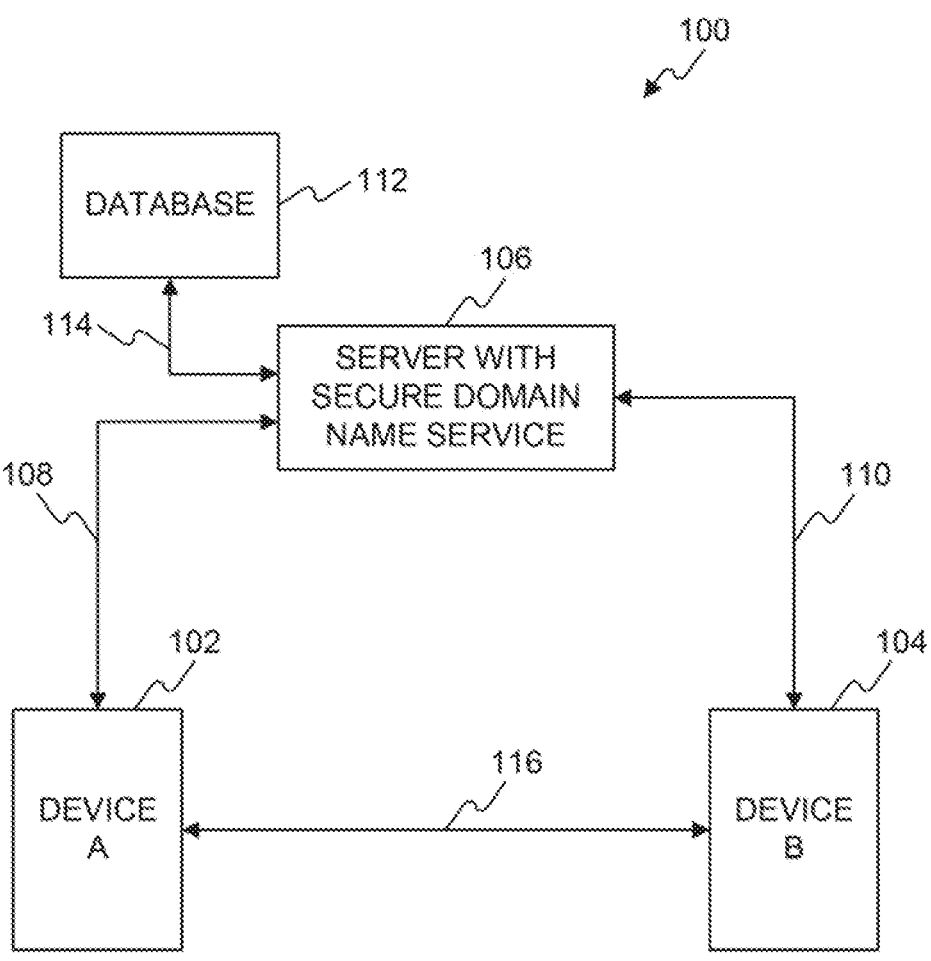
FIG. 1 shows an exemplary secure communication system for implementing embodiments of the present disclosure.

FIG. 1 shows a block diagram of an exemplary secure communication system 100 for implementing embodiments and features of the present disclosure. The arrangement and number of components in system 100 is provided for purposes of illustration. Additional and/or different arrangements, components, or other modifications may be made, consistent with the present disclosure.

As shown in FIG. 1, system 100 may include one or more devices or clients 102, 104. By way of example, clients 102, 104 may include smartphones, tablets, netbooks, electronic readers, personal digital assistants, personal computers, laptops, pagers, and/or other types of user electronic communication devices. It is also contemplated that clients 102, 104 may include desktop computers, servers, or other user devices connected to servers. Clients 102, 104 may be implemented with devices, and/or applications running thereon.

Client 102 may be configured to communicate with server 106 via a communication link 108. Communication link 108 may be part of the Internet and/or another type of wide area network, an intranet, a metropolitan area network, a local area network, a wireless network, a cellular communications network, etc. In some embodiments, client 102 or server 106 may configure communication link 108 as a secure communication link between client 102 and server 106. For example, communication link 108 may be an administrative virtual private network (VPN) between first client 102 and server 106, which may be established using the systems and methods disclosed in U.S. patent application Ser. No. 13/617,375 (the '375 application), the entire contents of which are expressly incorporated herein by reference. In other embodiments, communication link 108 may be an encrypted communication link between client 102 and server 108. In still other embodiments, communication link 108 may be an "in-the-clear" link between client 102 and server 106, as described in the '375 application.

Like client 102, client 104 may be configured to communicate with server 106 via a communication link 110. Communication link 110 may have a similar structure, features, and/or method of operation as communication link 108. Further, like communication link 108, in some embodiments, client 104 or server 106 may configure communication link 110 as a secure communication link between client 104 and server 106 similar to that described above with respect to communication link 108.

Client 102 may include a number of components, such as one or more hardware computer processor(s) (not shown) for performing operations related to the present disclosure. Client 102 may also include memory device(s) (not shown) and/or other data storage devices for storing instructions executed by the processor(s) and/or for storing data. Examples of memory devices and other storage devices include hard drives, RAID arrays, NOR or NAND flash memory devices, Read Only Memory (ROM) devices, etc. Client 102 may also include a display device (not shown) for displaying a variety of data and information to a user of client 102. In addition, client 102 may be equipped with input devices (not shown). By way of example, these input devices may include physical keyboards, virtual touch-screen keyboards, mice, joysticks, styluses, etc. In certain embodiments, client 102 may also be capable of receiving input through a microphone using voice recognition applications. Consistent with the disclosed embodiment, the input device may be configured to accept biometric user identification input from the user, such a photograph, a fingerprint, a speech sample, a facial image, an image of a retina or iris, or any other biometric information of the user. Client 104 may include components, features, and/or methods of operation as described above with respect to client 102.

Server 106 may identify one or more servers configured to interact with clients 102, 104 and/or database 112. Like clients 102, 104, server 106 may include a number of computing components, features, and/or methods of operation similar to those described above with respect to clients 102, 104, e.g., hardware processor(s), memory(ies), and/or data storage devices. In addition, consistent with some embodiments, server 106 may be implemented as a unitary server, a server system comprising a plurality of servers, or a server farm comprising a load balancing system and a plurality of servers. In one exemplary embodiment, server 106 may be configured as a secure domain name service. For example, server 106 may provide a secure domain name service as disclosed in the '375 application. In general, server 106 may be configured to receive a query, such as a domain name server (DNS) request, for a secure network address corresponding to a secure domain name.

Clients 102, 104 may establish a secure communication link 116 between each other using secure domain name information provided by server 106, using one or more methods described in the '375 application combined with the one or more methods described in this disclosure. Communication link 116 may be a secure communication link between clients 102, 104 over a public network, such as the Internet, a wide area network, a metropolitan area network, a wireless network, a cellular communications network, etc. In one embodiment, communication link 116 may be a virtual private network (VPN) established between clients 102, 104, which may be established using the systems and methods disclosed in the '375 application. The VPN may be a network of computers, including clients 102, 104, which privately and directly communicate with each other by encrypting traffic over insecure communication paths (e.g., the public network) between the computers as though they were on the same private network. For example, the VPN may implement packet tunneling and/or packet payload encryption over the public network. In one embodiment, the tunneling may include a network address hopping regime and/or a packet transport scheme described in the '375 application. In other embodiments, communication link 116 may simply be an encrypted communication link.

Server 106 may be in communication with database 112 via communication link 114. Database 112 may be collocated with server 102, or may include one or more logically and/or physically separate databases (e.g., as a service provider) configured to store data. The data stored in database 112 may be received from servers 106, directly from clients 102, 104, and/or may be provided as input using conventional methods (e.g., data entry, data transfer, data uploading, etc.). The data stored in database 112 may take or represent various forms including, but not limited to, user names, user identification information, and/or other data required to establish secure communication links between clients 102, 104 and/or server 106.

In some embodiments, database 112 may be implemented using a computer-readable storage medium. In other embodiments, database 112 may be maintained in a network attached storage device, in a storage area network, or combinations thereof, etc. Furthermore, database 112 may be maintained and queried using numerous types of database software and programming languages, such as SQL, MySQL, IBM DB2®, Microsoft Access®, PERL, C/C++, Java®, etc.

Although the above description describes clients 102, 104 and server 106 separately, clients 102, 104 may perform the role of servers 106 and vice-versa. Server 106 may also be collocated with, or on client 102, 104. For example, server 106 may be implemented as a secure name service module running in the client's web browser. Additionally, clients 102, 104 may have the same hardware components as servers 106. Furthermore, the embodiments of this disclosure may also be implemented on the same device serving, for example, both as a client 102, 104 and a server 106. Additionally, although the above description describes database 112 as being associated with server 106, it is contemplated that clients 102, 104 may additionally or alternatively communicate with database 112 to store or retrieve data and other information.

Figure 2:
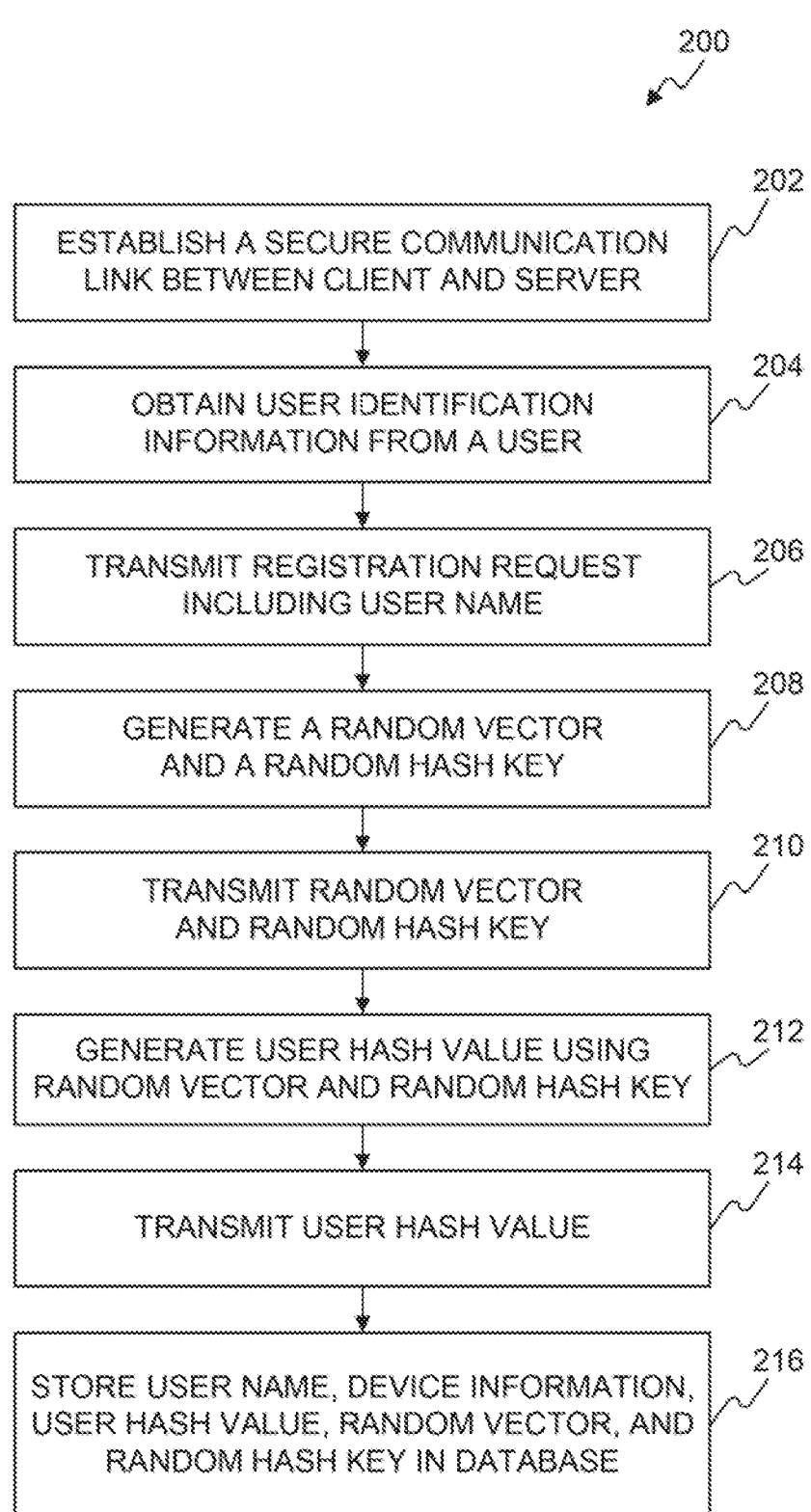
FIG. 2 shows an exemplary method of registering a user, consistent with an embodiment of the present disclosure.

FIG. 2 shows a flowchart of an exemplary registration method 200, consistent with an embodiment of the present disclosure. As further described below, the exemplary registration method 200 may be implemented for registering one or more users of clients 102, 104 with server 106, database 112, and/or the secure name service implemented by server 106. Method 200 may be implemented by the processor(s) of client 102 and/or server 106 executing computer-readable program instructions.

As shown in FIG. 2, method 200 may include a step 202 of establishing a secure communication link 108 (e.g., an administrative VPN or an "in-the-clear" link) between client 102 and server 106. Step 202 may be accomplished using one or more of the methods disclosed in the '375 application. Upon establishing the secure communication link between client 102 and server 106, server 106 knows the secure domain name of client 102. In one exemplary embodiment, client 102 may have a secure domain name having the form "device-a.user-a.domain.scom," where "device-a" may refer to client 102 and "user-a" may refer to a user of client 102. Additionally, "a.domain.scom" may refer to the secure domain of client 102. Further, "device-a" may include device information regarding client 102. For example, "device-a" may include a secure Internet protocol (IP) address of client 102. In some exemplary embodiments, "device-a" may include other characteristics of client 102, such as a MAC Address or any other information, which may uniquely identify client 102.

Method 200 may include a step 204 of obtaining user identification information from a user of client 102. In one exemplary embodiment, client 102 may obtain the user identification information via one or more input devices associated with client 102. Client 102 may also be configured to store the user identification information received from the input devices in a memory or storage device associated with client 102. Client 102 may also be configured to store the user identification information received from the input devices in a temporary storage device associated with client 102. In one exemplary embodiment, client 102 may access a memory or other storage device associated with client 102 to retrieve previously stored user identification information for a user.

The user identification information may include first identification information (for example, a user name of the user), second identification information (for example, biometric identification information of the user), or a combination thereof. The user name may include a login name of the user of client 102, an e-mail address of the user, or any combination of letters, numbers, and/or symbols representing the user. In one exemplary embodiment, the user name may include the entire secure domain name for client 102, including the user name. For example, the user name of a "user-a" of client 102 may take the form "device-a.user-a.domain.scom." In another exemplary embodiment the user name may include the user name associated with the domain of client 102. For example, the user name may take the form "user-a.domain.scom."

The biometric identification information (or "biometric information) may be a photograph, a fingerprint, a speech sample, a facial image, an image of a retina or iris, of the user or any other biometric information known in the art for the user. One of ordinary skill in the art would recognize that the data representing the biometric information may take many forms, including an image file, a sound file, or a set of values representing the biometric information. In one exemplary embodiment, the biometric information may be represented using a biometric identification vector (also referred to as "user identification vector) containing values representing the biometric information. It is to be appreciated that a biometric measurement for a user (e.g., a fingerprint scan), taken at client device 102, may be noisy and therefore may not be exactly identical each time a biometric measurement is obtained from a user. In one exemplary embodiment, the biometric information obtained from a user of client 102 may be rounded or approximated, within an acceptable deviation or variation of the biometric information, and the rounded or approximated biometric information may be represented by one or more user identification vectors. While the embodiments described below is illustrated with a single user identification vector, it should be understood that one practiced in the art can extend these embodiments to include multiple identification vectors and multiple hash values. Rounding or approximating the biometric information in this manner may reduce variations in the biometric information, within the acceptable deviation, so that that the biometric information can be reliably used in the user authentication methods 300 (FIG. 3) and 400 (FIG. 4), which will be discussed in detail below.

Method 200 may include a step 206 of transmitting a registration request including a user name. In one exemplary embodiment client 102 may send a registration request including the first identification information (for example, user name) to server 106. The user name may be the user name entered by the user in step 204. Depending upon the particular implementation, the registration request may or may not include the user identification vector. Method 200 may include a step 208 of generating a random vector and a random hash key. In one exemplary embodiment, upon receipt of the user name from client 102, server 106 may generate a random vector, which may include randomly-selected values. The random vector may be one-dimensional or multi-dimensional, and may have a randomly selected size. Further, in step 208, server 106 may generate a random hash key. The random hash key and/or the random vector may be generated using randomization schemes well known in the art.

As further illustrated in FIG. 2, method 200 may include a step 210 of transmitting the random vector and the random hash key. In one exemplary embodiment, server 106 may transmit the random vector and random hash key to client 102.

Method 200 may further include a step 212 of generating a hash value representing the user based on the random vector and random hash key received from server 106. In one exemplary embodiment, client 102 may combine the random vector received from server 106 with a second identification information of the user (for example, user identification vector obtained in step 204) to create a user vector. Client 102 may combine the random vector and user identification vector in many ways. For example, client 102 may add the random vector to the user identification vector. One of ordinary skill in the art would recognize, however, that client 102 may combine the random vector and the user identification vector using one or more other mathematical operations well known in the art. Client 102 may generate a user hash value by performing a hashing operation on the user vector using the random hash key provided by server 106. Client 102 may employ hashing algorithms well known in the art to generate the hash value.

Method 200 may also include a step 214 of transmitting the user hash value. In one exemplary embodiment, client 102 may transmit the user hash value to server 106. Further, process 200 may include a step 216 of storing the user name in database 112. Step 216 may also include storing device information of client 102, the random vector, the random hash key, and the user hash value received from client 102, in association with the user name and device information in database 112. In one exemplary embodiment, server 106 may store the user name, device information of client 102, the random vector, the random hash key, and the user hash value in association with each other in database 112.

One of ordinary skill in the art would recognize that biometric information of the same user, collected on different devices, may be different. One of ordinary skill in the art would further recognize that to correctly identify a user and the user's device, i.e., client 102, it may be necessary to associate device information of the device on which biometric information was obtained for a user with the user name of the user. Server 106 may pre-register users of client 102 in database 112 using method 200. Further, server 106 may pre-register users of client 104 in database 112, using method 200, in a manner similar to that described above with respect to registering users of client 102. However, it is to be appreciated that registration method 200 may be performed at any time before or during the course of establishing of communication link 116.

While the above exemplary registration process has been described with respect to database 112 associated with server 106, it will be understood that a similar registration process may occur with respect to databases associated with clients 102 and 104. For example, in addition to registering with server 106, client 102 may register itself with client 104. Accordingly, steps 202 through 216 may be carried out between client 102 and 104 with client 104 storing in its database device information of client 102, the random vector, the random hash key, and the user hash value received from client 102. Similarly, client 104 may register itself with client 102. Additionally, client 104 may perform a similar registration process with server 106 and/or client 102 in order to register itself. In the event clients 102 and 104 register with each other, the registration process may be carried out through server 106, which may act as an intermediary. Alternatively, clients 102 and 104 may establish a communication link with each other that may be secure to the extent that the data transmitted on the link is encrypted, for example. At this time, clients 102 or 104 may not be aware of each other's secure IP or network address that is used to establish the secure communication link 116 in the methods 300 (FIG. 3) and (FIG. 4), discussed below.

Figure 3:
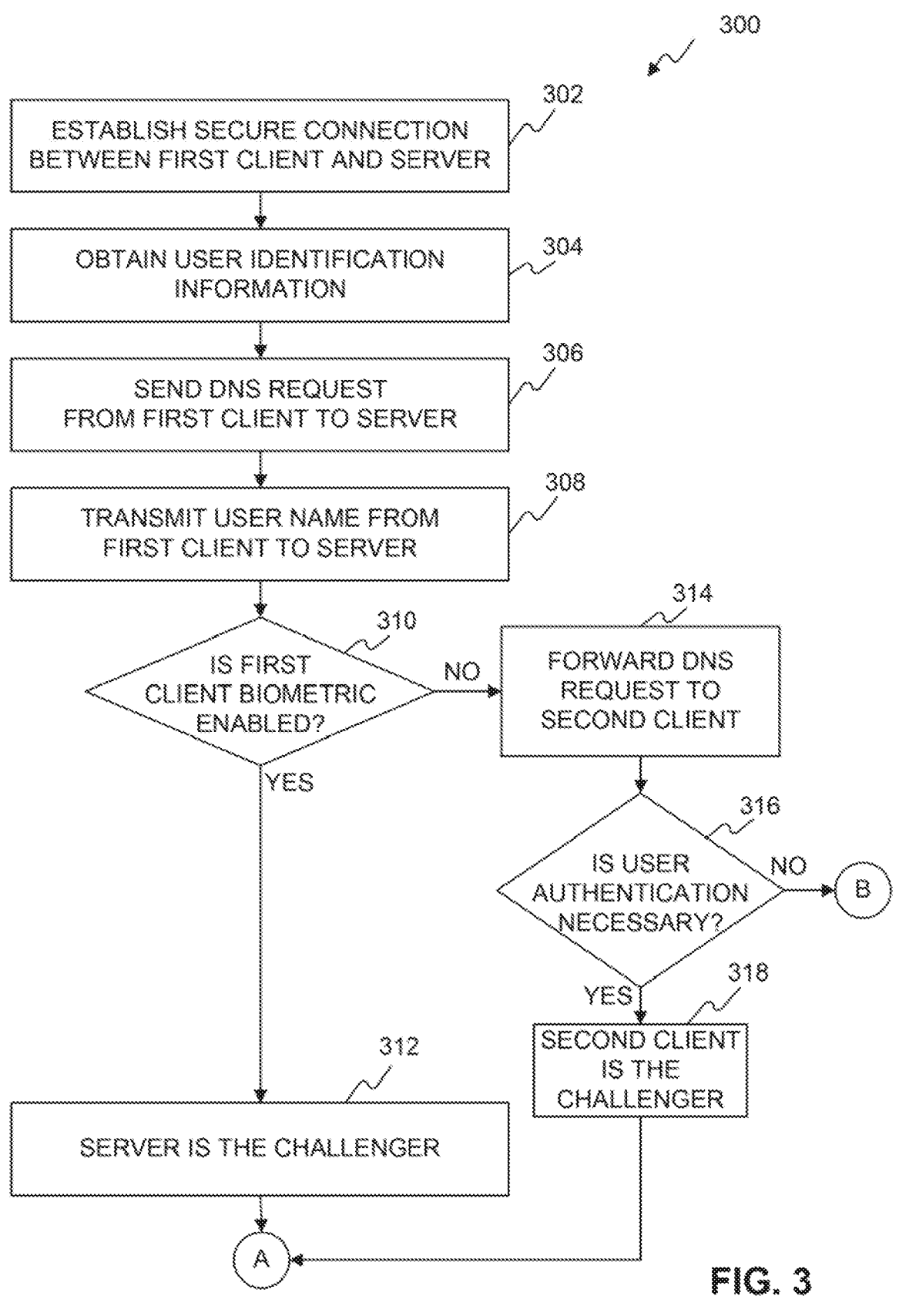
FIG. 3 shows an exemplary method of authenticating a user to provide a user-authenticated secure communication link, consistent with embodiments of the present disclosure.

FIG. 3 shows a flowchart of an exemplary method 300 for establishing a user-authenticated secure communication link between first client 102 and second client 104, consistent with an embodiment of the present disclosure. Depending upon the desired configuration, method 300 may occur after the registration process of FIG. 2, or may be performed as part, or during the course, of method 300.

As shown in FIG. 3, method 300 may include a step 302 of establishing a secure communication link 108 (e.g., an administrative VPN or an "in-the-clear" link) between client 102 and server 106. Step 302 may be accomplished using one or more of the methods disclosed in the '375 application in a manner similar to that described above with respect to step 202 of method 200 (FIG. 2).

Method 300 may include a step 304 of obtaining user identification information. In one exemplary embodiment, client 102 may obtain the user identification information of a user of client 102. Client 102 may obtain user identification information in a manner similar to that described above with respect to step 204 of method 200 (FIG. 2).

Method 300 may include a step 306 of sending a DNS request from client 102 to server 106. The DNS request may include a request to lookup a secure network address corresponding to a secure domain associated with client 104. An example of a secure domain associated with client 104 may be "device-b.user-b.domain.scom," or "device-b.domain.scom," or any other secure domain name that uniquely identifies second client 104. It is to be appreciated, however, that the secure domain name may have any desired format.

Method 300 may also include a step 308 of transmitting the user name to server 106. In one exemplary embodiment, client 102 may transmit a user name obtained in step 304 to server 106. The user name may be similar to that described earlier with respect to step 204 of process 200 (FIG. 2). One of ordinary skill in the art would recognize that steps 306 and 308 may be performed simultaneously or sequentially in any order.

Method 300 may further include a step 310 in which server 106 may determine whether client 102 is biometric-enabled. As used in this disclosure "biometric-enabled" means that a device is capable or enabled to supply biometric identification information of the user and/or capable of establishing a user-authenticated secure communication link. For example, client 102 may be biometric-enabled if a particular setting is "on" in secure communications software module installed on client 102. Server 106 may determine whether first client 102 is biometric-enabled in many ways. For example, server 106 may refer to information, such as a device digital certificate, previously registered by client 102 with server 106 to determine whether client 102 is biometric-enabled. In one embodiment, the certificate may have a flag that indicates whether the device is biometric-enabled, i.e., enabled to supply the biometric identification information of the user. Thus, in making the determination of step 306, server 106 may consult the flag if it exists.

Figure 4:
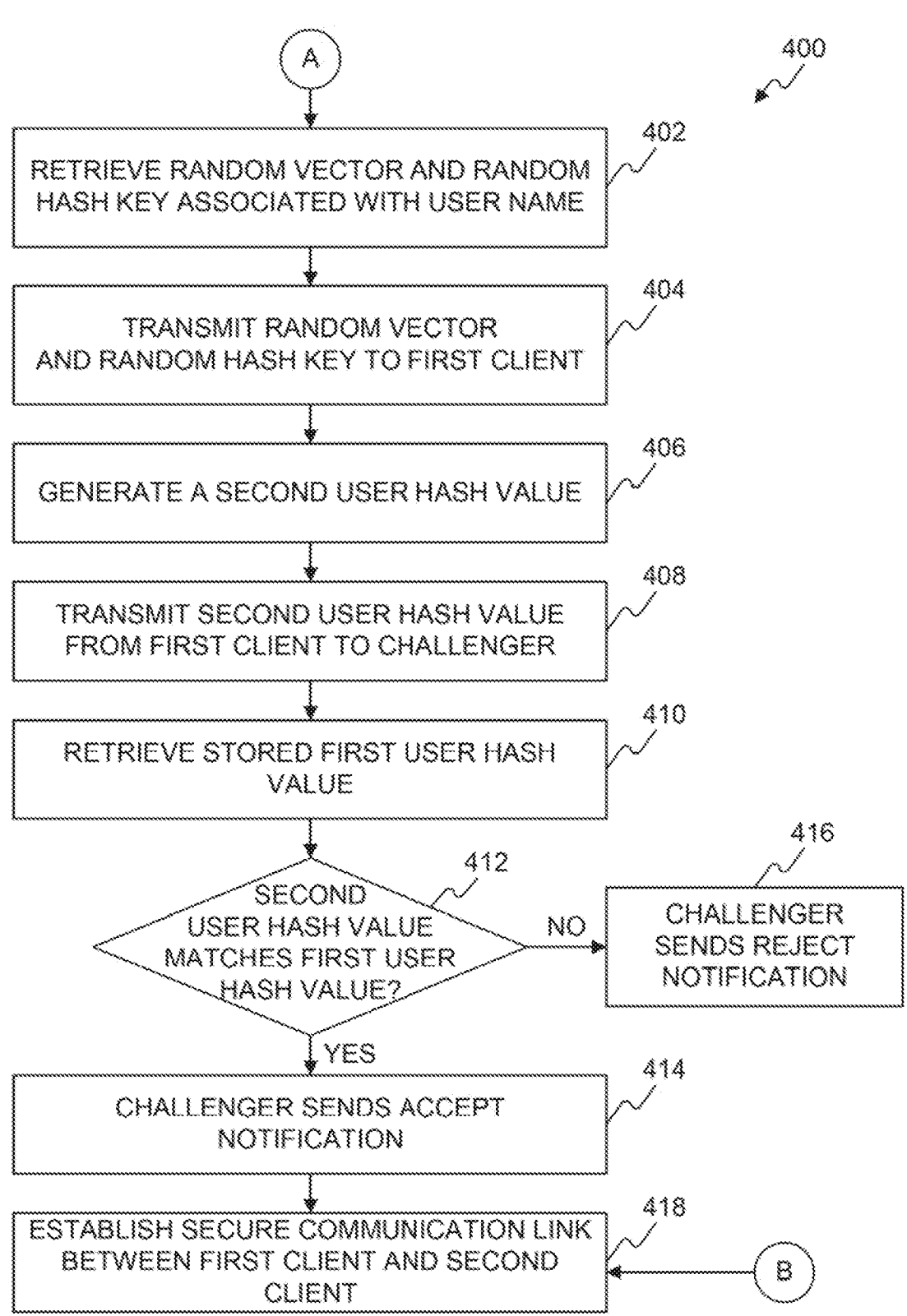
FIG. 4 shows another exemplary method of authenticating a user to provide a user-authenticated secure communication link, consistent with an embodiment of the present disclosure.

When server 106 determines that client 102 is biometric-enabled (Step 310, YES), server 106 may set itself as a "challenger" (Step 312) and proceed to authenticate the user of first client 102 (via "A" in FIG. 4). As used herein, "challenger" means a device which is challenging another device to properly authenticate its user.

When server 106 determines, however, that first client 102 is not biometric-enabled (step 310, NO), method 300 may proceed to step 314 in which server 106 may forward the DNS request received from client 102 to client 104. Method 300 may proceed to step 316 in which client 104 may decide whether user authentication is necessary. If, however, client 104 decides that user authentication is necessary (Step 316, YES), client 104 may set itself as the challenger (Step 318) and proceed to authenticate the user of client 102 (via "A" in FIG. 4). If client 104 decides, however, that user authentication is not necessary, client 104 may provide the secure network address of client 104 to client 102, and that secure network address maybe used to establish a secure communication link between clients 102, 104. As discussed above, however, this link maybe be vulnerable to access by nefarious users at client 102 who have not been authenticated by system 100. One of ordinary skill in the art would recognize that because client 102 and client 104 have not yet established a secure communication link 116, second client 104 may communicate with first client 102 during the challenge process via server 106, in some embodiments. In an alternative embodiment, if client 104 is the challenger, a direct communication link may be established between clients 102 and 104 that may be secure to the extent that the data transmitted on the link is encrypted. Clients 102 or 104 may not be aware of each other's secure network address at this time. Irrespective of who the challenger is, method 300 may proceed via "A" to step 402 of FIG. 4, which will be described in more detail below.

FIG. 4 shows a flowchart of an exemplary challenge method 400, consistent with an embodiment of the present disclosure. As further described below, the exemplary method of FIG. 4 may be implemented to execute the challenge process for authenticating the user and establishing a user-authenticated secure communication link 116 between first client 102 and second client 104.

As shown in FIG. 4, method 400, may include a step 402 for retrieving the random vector and random hash key associated with the user name of the user of first client 102. In one exemplary embodiment, the challenger (server 106 or client 104) may access database 112 to retrieve the random vector and random hash key. Accessing database 112 may involve reading information in database 112 from a memory or storage device associated with one of server 106 or client 104. The challenger may identify the random vector and random hash key stored in association with the user name and the device information of first client 102 in database 112.

Method 400 may include a step 404 of transmitting the random vector and random hash key corresponding to the user name to client 102. In one embodiment, when client 104 is the challenger, it may transmit the random vector and random hash key to server 106 which, in turn, may transmit the random vector and random hash key to client 102.

Method 400 may include a step 406 of generating a second user hash value based on the user identification information obtained previously in step 308 and the random vector and random hash key provided to client 102 by the challenger. In one exemplary embodiment, client 102 may generate the second user hash value in a manner similar to that described above with respect to step 212 of process 200 (FIG. 2).

Method 400 may further include a step 408 of transmitting the second user hash value from client 102 to the challenger. When server 106 is the challenger, client 102 may transmit the second user hash value to server 106 via communication link 108. Alternatively, if client 104 is the challenger, client 102 may transmit the second user hash value to server 106 via communication link 108, and server 106 may further transmit the second user hash value to second client 104 via communication link 110.

Method 400 may also include a step 410 of retrieving the hash value corresponding to the user and client 102. This hash value may be referred to as "first user hash value." In one exemplary embodiment, the challenger (server 106 or client 104) may retrieve the first user hash value stored in association with the user name from database 112. The challenger may retrieve the first user hash value in a manner similar to the challenger's retrieval of the random vector and random hash key described above with regard to step 402. One of ordinary skill in the art would recognize that the challenger may retrieve the random vector, the random hash key, and the first user hash value simultaneously or sequentially.

Method 400 may include a step 412 of determining whether the second user hash value received by the challenger from client 102 matches the first user hash value stored in database 112. When the challenger determines that the second user hash value matches the first user hash value (step 412, YES), the challenger may send an accept notification to client 102 notifying client 102 that the user has been authenticated (Step 414). When the challenger determines, however, that the second user hash value does not match the first user hash value (step 412, NO), the challenger may send a reject notification to client 102 notifying client 102 that the user has not been authenticated (step 416).

As part of step 414, server 106 may provide client 102 with the secure network address of second client 104 in response to the DNS request transmitted by client 102. One of ordinary skill in the art would recognize that when client 104 is the challenger, it may notify server 106 that the user has been authenticated in step 414. After receiving the notification from client 104, server 106 may send the secure network address of client 106 to client 104. Server 106 may or may not have the secure network address of client 104, in which case client 104 may provide its secure network address to server 106 once the user has been authenticated. Server 106 may then transmit the secure network address of client 104 to client 102 as part of step 414.

In one exemplary embodiment, client 104 may also be a server and may be "headless." As used in this disclosure, "headless" refers to a device which does not have an operator's console and/or a user at the console. In this exemplary embodiment, only one user, the user of client 102 may need to be authenticated.

Although the above description discusses authentication of a user of client 102, a user of another client 104 may be authenticated using methods 300 and 400 in a similar manner. One of ordinary skill in the art would recognize that during authentication of a user of client 104, server 106 and/or client 102 may play the role of the challenger. One of ordinary skill in the art would also recognize that in addition to authenticating users of clients 102, 104, clients 102, 104 may also be authenticated using methods 300 and 400 described above. For example, by including information regarding clients 102 and 104 in the user identification information, methods 300 and 400 may be used to authenticate clients 102, 104 in addition to users of clients 102, 104. Further, one of ordinary skill in the art would recognize that after the user of client 106 has been authenticated, server 106 may send the secure network address of first client 102 to second client 104.

Method 400 may also include a step 418 in which client 102 may establish secure communication link 116 with client 104 for the user of client 102, who has been authenticated in proceeding steps 402-414. One of ordinary skill in the art would recognize that when users of both clients 102, 104 are authenticated, communications transmitted over secure communication link 116 can be trusted by clients 102, 104 as originating from authenticated users.

FIG. 5 shows a flowchart of an exemplary registration method 500, consistent with an embodiment of the present disclosure. Method 500 is similar to method 200 in certain aspects. In particular, FIG. 5 describes a variation of the exemplary embodiment set forth with respect to FIG. 2 and therefore, an explanation of the common elements between these two embodiments is omitted in the interest of conciseness. Rather, FIG. 5 is explained primarily in terms of exemplary differences between the methods of FIGS. 2 and 5. As explained below, the steps of method 500 may be implemented by the processor(s) of client 102, client 104, and/or server 106 executing computer-readable program instructions stored in memory.

Step 502 may be similar to step 202. Step 504 may be similar to step 204. Step 506 may be similar to step 206. Step 508 may be similar to step 208 except that a first random hash key (HK1) may be generated by server 106 instead of a random hash key and a random vector. Similar to step 210, method 500 may include a step 510 of transmitting HK1, except that no random vector is transmitted in step 510. In one exemplary embodiment, server 106 may transmit HK1 to client 102. Additionally, in step 510, server 106 may transmit a public key of server 106 (which may be acting as a registrar).

Method 500 may further include a step 512 of generating a first user hash value representing the user based on HK1. In one exemplary embodiment, client 102 may generate a first user hash value (X) representing the user by performing a hashing operation on the user identification vector using HK1 provided by server 106. Client 102 may employ hashing algorithms well known in the art to generate the first user hash value (X).

Method 500 may also include a step 514 of transmitting the first user hash value (X). In one exemplary embodiment, client 102 may transmit X to server 106. Further, process 500 may include a step 516 of storing the user name in database 112. Step 516 may also include storing device information of client 102, HK1, and X, in association with the user name in database 112. In one exemplary embodiment, server 106 may store the user name, device information of client 102, KH1, and X in association with each other in database 112.

One of ordinary skill in the art would recognize that biometric information of the same user, collected on different devices, may be different, for example, due to characteristics or settings of the device on which the biometric information was collected. One of ordinary skill in the art would further recognize that to correctly identify a user and the user's device, e.g., client 102, it may be necessary to associate device information of the device on which biometric information was obtained for a user with the user name of the user. Server 106 may pre-register users of client 102 in database 112 using method 500. Further, server 106 may pre-register users of client 104 in database 112, using method 500, in a manner similar to that described above with respect to registering users of client 102. However, it is to be appreciated that registration method 500 may be performed at any time before or during the course of establishing of communication link 116.

As discussed above with reference to the registration process of FIG. 2, a similar registration process may occur with respect to databases associated with clients 102 and 104. For example, in addition to registering with server 106, client 102 may register itself with client 104. Further, as discussed earlier, in the event clients 102 and 104 register with each other, the registration process may be carried out through server 106, which may act as an intermediary. Alternatively, clients 102 and 104 may establish a communication link with each other that may be secure to the extent that the data transmitted on the link is encrypted. Clients 102 or 104 may not be aware of each other's secure IP or network address at this time.

FIG. 6 shows a flowchart for establishing a user-authenticated secure communication link between client 102 and client 104, consistent with an embodiment of the present disclosure. In some embodiments, the method 600 may occur after the registration process of FIG. 5. In other embodiments, however, the registration process of FIG. 5 may be performed as part of or during the course of method 600. Each of the steps in method 600 is similar to steps in method 300. For example, step 602 in method 600 is similar to step 302 in method 300. Similarly, step 616 in method 600 is similar to step 313 in method 300. Accordingly, the steps of method 600 are not described herein for conciseness. As with the other disclosed methods, the steps of method 600 may be implemented by the processor(s) of client 102, client 104, and/or server 106 executing computer-readable program instructions stored in memory.

FIG. 7 shows a flowchart of an exemplary challenge method 700, consistent with an embodiment of the present disclosure. As further described below, the exemplary method of FIG. 7 may be implemented to execute the challenge process for authenticating the user and establishing a user-authenticated secure communication link 116 between client 102 and client 104. Method 700 is similar to method 400 in certain respects. One difference between method 700 and method 400 is that, in method 700, the user identification vector is not revealed to the registrar and challenger. As with the other disclosed methods, the steps of method 700 may be implemented by the processor(s) of client 102, client 104, and/or server 106 executing computer-readable program instructions stored in memory.

As shown in FIG. 7, method 700, may include a step 702 for retrieving the first random hash key associated with the user name of the user of client 102. In one exemplary embodiment, the challenger (server 106 or client 104) may access database 112 to retrieve the first random hash key (HK1). Accessing database 112 may involve reading information in database 12 from a memory or storage device associated with one of server 106 or client 104. The challenger may identify the first random hash key stored using the user name and the device information of first client 102 in database 112. In step 702, challenger may also generate a random vector, which may include randomly-selected values. The random vector may be one-dimensional or multi-dimensional, and may have a randomly-selected size. Challenger may further generate a second random hash key (HK2).

Method 700 may include a step 704 of transmitting the random vector, HK1, and HK2. In one embodiment, when client 104 is the challenger, it may transmit the random vector, the random hash keys (HK1 and HK2) to server 106 which, in turn, may transmit them to client 102.

Method 700 may include a step 706 of generating a second user hash value (X') based on the user identification information obtained previously in step 604 and HK1. In one exemplary embodiment, client 102 may generate X' in a manner similar to that described above with respect to step 512 of process 500 (FIG. 5). In step 706, client 102 may further generate a third user hash value (V) from the second user hash value (X'). For example, client 102 may perform an exclusive OR between X' and the random vector received from challenger to get a first resulting vector (Z). Next, client 102 may take a hash of Z using the second random hash key (HK2) to obtain the third user hash value (V).

Method 700 may further include a step 708 of transmitting the third user hash value (V) from client 102 to the challenger. When server 106 is the challenger, client 102 may transmit V to server 106 via communication link 108. Alternatively, if client 104 is the challenger, client 102 may transmit V to server 106 via communication link 108, and server 106 may further transmit V to second client 104 via communication link 110.

Method 700 may also include a step 710 of retrieving the first user hash value (X) corresponding to the user and client 102. In one exemplary embodiment, the challenger (server 106 or client 104) may retrieve X stored in association with the user name from database 112. The challenger may retrieve X in a manner similar to the challenger's retrieval of the first random hash key (HK1) described above with regard to step 702. Next, the challenger may generate a fourth user hash value (V') based on X. For example, the challenger may generate a second resulting vector (Z') by performing an exclusive OR between X and the random vector that challenger sent to client 102 in step 704. Challenger may then obtain V' by taking a hash of Z' using the second random hash key (HK2).

Method 700 may include a step 712 of determining whether the third user hash value (V) received by the challenger from client 102 matches the fourth user hash value (V'). When the challenger determines that they match (step 712, YES), the challenger may send an accept notification to client 102 notifying client 102 that the user has been authenticated (Step 714). When the challenger determines, however, that the hash values do not match (step 712, NO), the challenger may send a reject notification to client 102 notifying client 102 that the user has not been authenticated (step 716).

As part of step 714, server 106 may provide client 102 with the secure network address of client 104 in response to the DNS request transmitted by client 102. One of ordinary skill in the art would recognize that when client 104 is the challenger, it may notify server 106 that the user has been authenticated in step 414. After receiving the notification from client 104, server 106 may send the secure network address of client 106 to client 104. Server 106 may or may not have the secure network address of client 104, in which case client 104 may provide its secure network address to server 106 once the user has been authenticated. Server 106 may then transmit the secure network address of client 104 to client 102 as part of step 714.

In one exemplary embodiment, client 104 may also act as a server and may be "headless." As used in this disclosure, "headless" refers to a device which does not have an operator's console and/or a user at the console. In this exemplary embodiment, only one user, the user of client 102 may need to be authenticated.

Although the above description discusses authentication of a user of client 102, a user of another client 104 may be authenticated using methods 600 and 700 in a similar manner. One of ordinary skill in the art would recognize that during authentication of a user of client 104, server 106 and/or client 102 may play the role of the challenger. One of ordinary skill in the art would also recognize that in addition to authenticating users of clients 102, 104, clients 102, 104 may also be authenticated using methods 600 and 700 described above. For example, by including information regarding clients 102 and 104 in the user identification information, methods 600 and 700 may be used to authenticate clients 102, 104 in addition to users of clients 102, 104. Further, one of ordinary skill in the art would recognize that after the user of client 106 has been authenticated, server 106 may send the secure network address of first client 102 to second client 104.

Method 700 may also include a step 718 in which client 102 may establish secure communication link 116 with client 104 for the user of client 102, who has been authenticated in preceding steps 702-714. One of ordinary skill in the art would recognize that when users of both clients 102, 104 are authenticated, communications transmitted over secure communication link 116 can be trusted by clients 102, 104 as originating from authenticated users.

While the exemplary methods and processes may be described herein as a series of steps, it is to be understood that the order of the steps may be varied. In particular, non-dependent steps may be performed in any order, or in parallel. Moreover, the above-noted features and other aspects and principles of the present invention may be implemented in various environments. Such environments and related applications may be specially-constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Systems and methods consistent with the present invention also include computer readable media that include program instruction or code for performing various computer-implemented operations based on the methods and processes of the disclosure. The media and program instructions may be those specially designed and constructed for the purposes of the disclosure, or they may be of the kind well known and available to those having skill in the computer software arts. Examples of program instructions include for example machine code, such as produced by a compiler, and files containing a high level code that can be executed by the computer using an interpreter.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

The invention claimed is:

1. A server configured to establish a secure communications link between a first device and a second device, the server comprising:
   one or more processors configured to:
     receive, from the first device, a request to establish the secure communications link between the first device and the second device;
     identify, based at least in part on user information associated with the first device, a random vector and a random hash key;
     send, to the first device, the random vector and the random hash key;
     receive, from the first device, a first hash value, wherein the first hash value is based at least in part on the user information, the random vector, and the random hash key;
     determine that the first hash value matches a second hash value, the second hash value generated using biometric information associated with the first device;
     establish, based at least in part on the second hash value matching the first hash value, the secure communications link between the first device and the second device; and
     register the user information in association with the second hash value to authenticate domain name service requests from the first device.

2. The server of claim 1, wherein the one or more processors are further configured to:
   receive, from the first device, the user information associated with a user of the first device.

3. The server of claim 1, wherein the one or more processors are further configured to:
   receive, from the first device, the second hash value generated using the random hash key.

4. The server of claim 3, wherein the one or more processors are further configured to:
   send, to the first device, a public key for the server, wherein the received second hash value is encrypted by the first device using the public key.

5. The server of claim 3, wherein the one or more processors are further configured to:
   receive, from the first device, a registration request including the user information, wherein generating the random hash key is based at least in part on receiving the registration request.

6. The server of claim 1, wherein the one or more processors are further configured to:
   receive, from a third device, a request to establish a second secure communications link with the second device;
   receive, from the third device, second user information;
   send, to the third device, a second random vector and a second random hash key;
   receive, from the third device, a third hash value;
   identify, based at least in part on the second user information, a fourth hash value;

determine that the third hash value is different from the
fourth hash value; and
send a reject notification to the third device based at least
in part on the third hash value being different from the
fourth hash value.
7. The server of claim 6, wherein the one or more
processors are further configured to:
identify, based at least in part on the second user infor-
mation, the second random vector and the second
random hash key associated with the second user
information.
8. The server of claim 1, wherein the one or more
processors are further configured to:
send an accept notification to the first device when the first
hash value matches the second hash value.
9. The server of claim 1, wherein at least one of the first
device and the second device is a mobile device.
10. The server of claim 1, wherein the second hash value
is generated using a biometric identification vector including
the biometric information of a user.
11. A method to establish a secure communications link
between a first device and a second device, comprising:
receiving, by a server and from the first device, a request
to establish the secure communications link between
the first device and the second device;
identifying, by the server and based at least in part on user
information associated with the first device, a random
vector and a random hash key;
sending, by the server and to the first device, the random
vector and the random hash key;
receiving, by the server and from the first device, a first
hash value, wherein the first hash value is based at least
in part on the user information, the random vector, and
the random hash key;
determining, by the server, that the first hash value
matches a second hash value, the second hash value
generated using biometric information associated with
the first device;
establishing, by the server and based at least in part on the
second hash value matching the first hash value, the
secure communications link between the first device
and the second device; and
registering, by the server, the user information in asso-
ciation with the second hash value to authenticate
domain name service requests from the first device.

12. The method of claim 11, further comprising:
receiving, by the server and from the first device, the user
information associated with a user of the first device.
13. The method of claim 11, further comprising:
receiving, by the server and from the first device, the
second hash value generated using the random hash
key.
14. The method of claim 13, further comprising:
sending, by the server and to the first device, a public key
for the server, wherein the second hash value is
encrypted by the first device using the public key.
15. The method of claim 13, further comprising:
receiving, by the server and from the first device, a
registration request including the user information,
wherein generating the random hash key is based at
least in part on receiving the registration request.
16. The method of claim 11, further comprising:
receiving, by the server and from a third device, a request
to establish a second secure communications link with
the second device;
receiving, by the server and from the third device, second
user information;
sending, by the server and to the third device, a second
random vector and a second random hash key;
receiving, by the server and from the third device, a third
hash value;
identifying, by the server and based at least in part on the
second user information, a fourth hash value;
determining, by the server, that the third hash value is
different from the fourth hash value; and
sending, by the server, a reject notification to the third
device based at least in part on the third hash value
being different from the fourth hash value.
17. The method of claim 16, further comprising:
identifying, by the server and based at least in part on the
second user information, the second random vector and
the second random hash key associated with the second
user information.
18. The method of claim 11, further comprising:
sending, by the server, an accept notification to the first
device when the first hash value matches the second
hash value.

* * * * *